Patented Sept. 7, 1926.

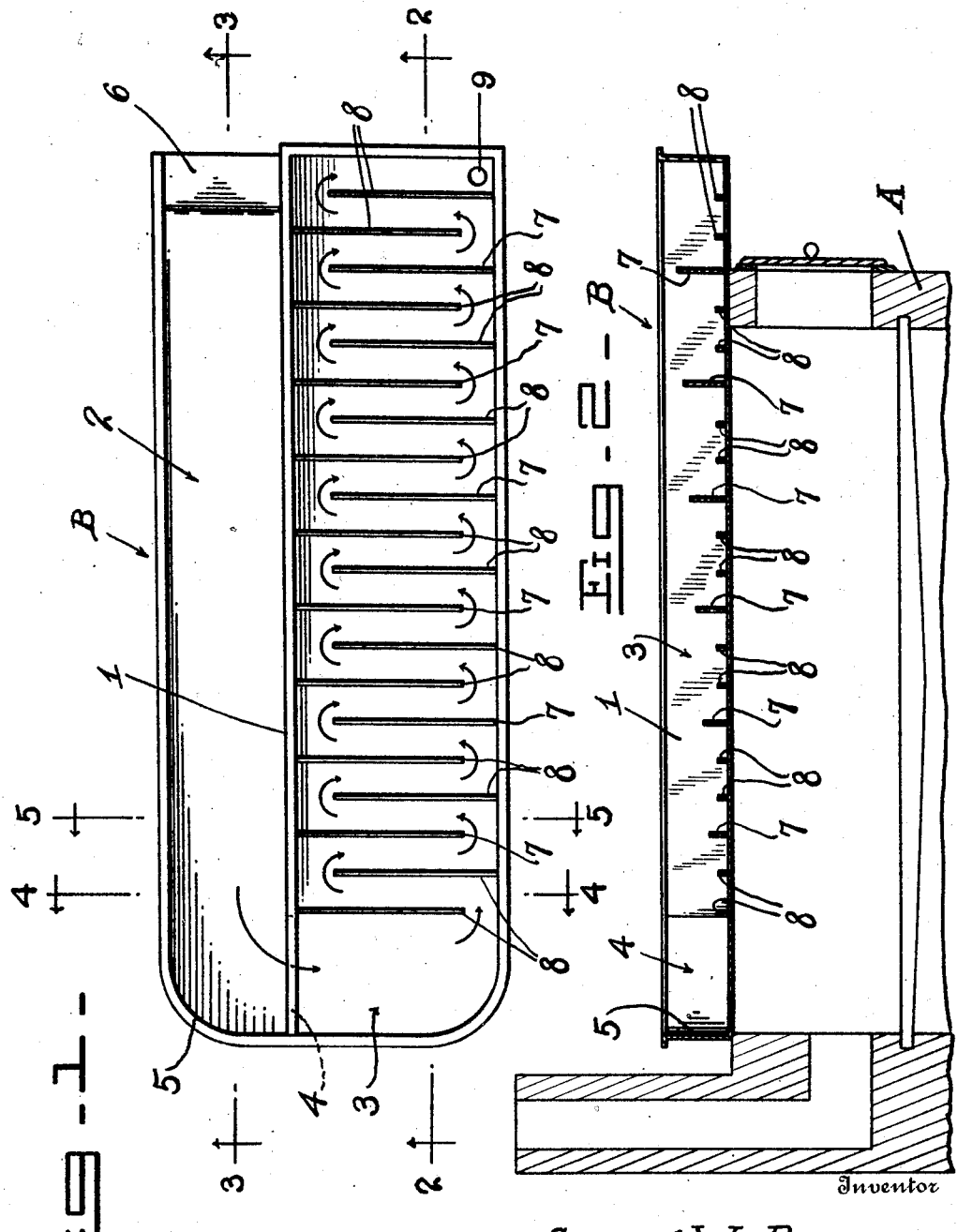

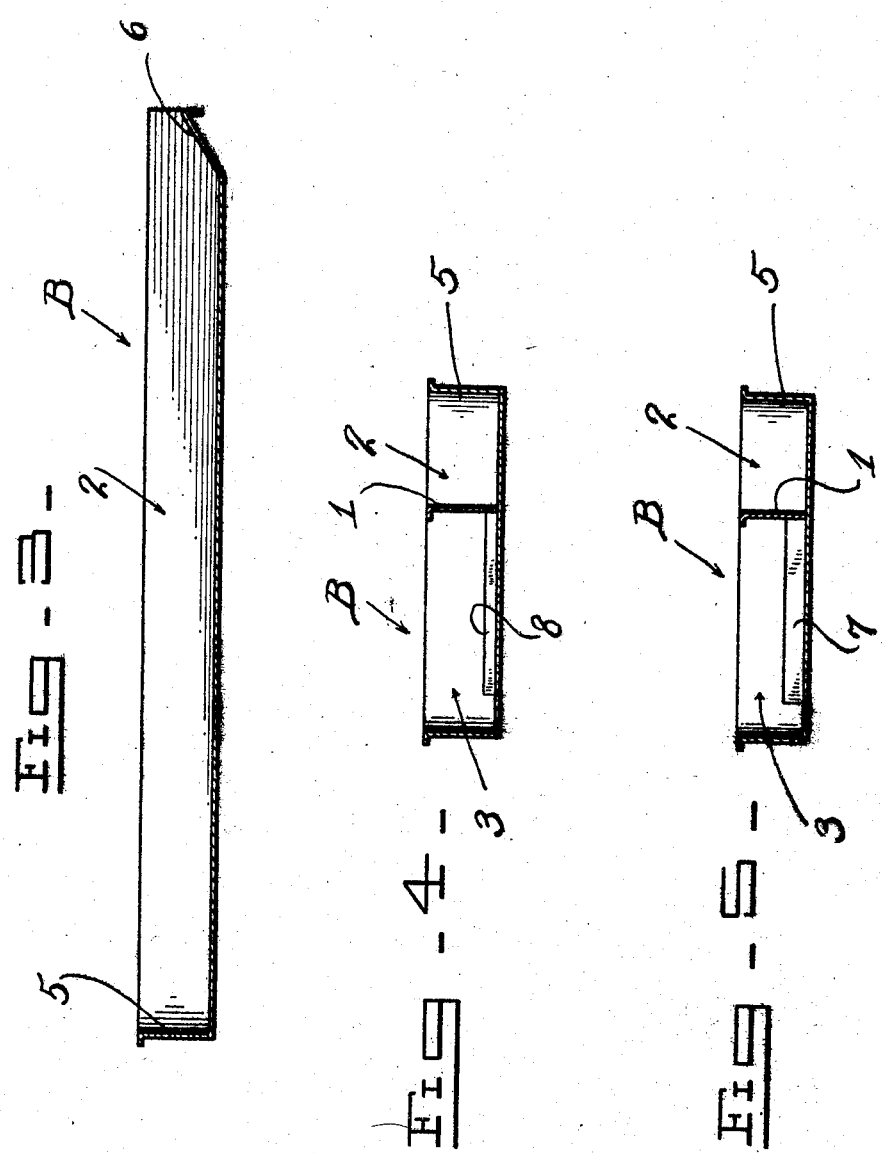

1,598,670

UNITED STATES PATENT OFFICE.

SAMUEL W. BARNES, OF BARNUM, TEXAS.

EVAPORATOR FOR RIBBON CANE SIRUP.

Application filed June 15, 1923. Serial No. 645,610.

This invention relates to an evaporator for making sirup from cane juice and the like, the general object of the invention being to provide means whereby the skimmings can easily be removed from the material as the boiling operation is being carried out.

Another object of the invention is to so arrange the parts that the pan may be placed at a slight inclination on the furnace.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:

Fig. 1 is a plan view.
Fig. 2 is a section on line 2—2 of Fig. 1.
Fig. 3 is a section on line 3—3 of Fig. 1.
Fig. 4 is a section on line 4—4 of Fig. 1.
Fig. 5 is a section on line 5—5 of Fig. 1.

In these views A indicates the furnace which may be of any desired type and B indicates the pan which forms the subject matter of the present application. This pan is divided by the partition 1 into the chambers 2 and 3. The aforesaid partition 1 has its upper edge provided with a flange 1' adapted to project over the chamber 3 so as to prevent boiling sirup from passing over the partition back into the chamber 2. An opening 4 is made in the rear end of the partition to afford communication between the two chambers and the rear wall of the chamber 2 is curved, as shown at 5, to direct the fluid into the opening. The inlet end of chamber 2 has an inclined part 6 upon which the juice is poured so that it will run down the chamber 2, through the opening 4 into the chamber 3. This chamber 3 is provided with the major baffles 7 which are alternately arranged so as to form a zigzag path for the fluid and said partitions are of gradually increasing height. The chamber is also provided with the minor baffles 8, a pair of which are arranged on each side of the major baffles and each baffle of one pair is alternately arranged with respect to the other baffle of the pair.

The pan is partly filled with juice and then the fire is started in the furnace. As soon as the juice comes to a boil the flow of juice is started so as to keep from one to two inches in the pan. As the sirup thickens it raises in the chamber 3 so that the skimmings flow over the baffles and pass back into the chamber 2 where they can be easily removed. The finished sirup passes through the outlet 9 into a suitable receptacle.

With this apparatus the juice is kept running practically all the time and the sirup will be flowing from the apparatus practically all the time, so that a large quantity of juice can be treated with this apparatus.

The baffles form a zigzag passage for the juice and during the boiling process the skimmings will rise above the baffles and thus pass back into the first chamber. As the baffles gradually increase in height the action is automatic and most of the skimmings are separated at the front end of the chamber.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

In an evaporator of the class described comprising a pan, a longitudinally extending partition dividing the pan into chambers of different widths, said partition having a passage beneath one end thereof forming communication between the chambers, an inclined wall at that end of the smaller chamber remote from the passage in the partition and having its upper extremity terminating below the upper edge of the chamber, a discharge spout in that end of the larger chamber remote from the passage, spaced baffles on the bottom of the larger chamber with their upper edges lying on a plane inclined upwardly from that end of the chamber adjacent the passage and with their free ends terminating in spaced relation to the wall of the larger chamber, other spaced baffles of uniform heights disposed on the feed sides of the first mentioned baffles and having their ends alternately spaced from the wall of the larger chamber and partition, and a flange on the upper edge of the partition extending toward the larger chamber.

In testimony whereof I affix my signature.

SAMUEL W. BARNES.